United States Patent
Bloom et al.

(10) Patent No.: US 10,472,166 B2
(45) Date of Patent: Nov. 12, 2019

(54) TRANSPORTABLE CONTAINER WITH SUBFLOOR FOR USE WITH A ROLL-OFF TRUCK

(71) Applicants: John Bloom, Addison, TX (US); Carl Gosnay, Plano, TX (US)

(72) Inventors: John Bloom, Addison, TX (US); Carl Gosnay, Plano, TX (US)

(73) Assignee: DFW Disposal and Recycling Service, LLC, Plano, TX (US)

( * ) Notice: Subject to any disclaimer, the term of this patent is extended or adjusted under 35 U.S.C. 154(b) by 0 days.

(21) Appl. No.: 15/814,495

(22) Filed: Nov. 16, 2017

(65) Prior Publication Data

US 2019/0144201 A1 May 16, 2019

(51) Int. Cl.
| | |
|---|---|
| *B65D 88/12* | (2006.01) |
| *B65D 90/00* | (2006.01) |
| *B60P 1/64* | (2006.01) |
| *B65D 90/06* | (2006.01) |
| *B61D 17/10* | (2006.01) |

(52) U.S. Cl.
CPC .......... *B65D 88/129* (2013.01); *B60P 1/6463* (2013.01); *B65D 90/0033* (2013.01); *B60P 1/6418* (2013.01); *B61D 17/10* (2013.01); *B65D 90/06* (2013.01)

(58) Field of Classification Search
CPC ..... B65D 88/129; B60P 1/6418; B60P 1/6483
USPC .................................................. 414/491, 494
See application file for complete search history.

(56) References Cited

U.S. PATENT DOCUMENTS

| | | | | |
|---|---|---|---|---|
| 3,934,740 A | | 1/1976 | Rumell | |
| 4,015,715 A | * | 4/1977 | Kelf .................... | B65D 88/126 206/386 |
| 4,529,349 A | * | 7/1985 | Lutz .................... | B60P 1/6454 414/421 |
| 4,936,733 A | | 6/1990 | Girerd | |
| 4,986,719 A | * | 1/1991 | Galbreath ............ | B60P 1/6454 280/405.1 |
| 5,085,448 A | | 2/1992 | Shubin | |
| 5,088,875 A | | 2/1992 | Galbreath et al. | |
| 5,213,466 A | * | 5/1993 | Bubik .................. | B60P 1/6463 414/494 |
| 5,395,203 A | * | 3/1995 | Januel ................. | B60P 1/6463 108/55.1 |
| 5,799,585 A | * | 9/1998 | Brennan, Jr. ....... | B65D 19/0026 108/53.1 |
| 5,884,794 A | * | 3/1999 | Calhoun ............. | B65D 88/121 105/355 |

(Continued)

*Primary Examiner* — Mark C Hageman
(74) *Attorney, Agent, or Firm* — Sheri Higgins; Sheri Higgins Law (57) ABSTRACT

A transportable container comprises: a sidewall; a front wall; a floor; and a subfloor, wherein the subfloor is removably attached to a bottom of the floor, wherein the subfloor comprises: two or more rails, wherein the two or more rails matingly engage with two or more hoist rails of a roll-off truck; and two or more rollers. The roll-off truck can include a system for loading, transporting, and unloading the container and subfloor. The system can be a cable/winch system or a hook/lift system. The subfloor can be removably attached to a floor of the container via welding or spot welding, fastening, bracketing, or bolting. The container can be any type of container that is not capable of being loaded, transported, and unloaded using a roll-off truck.

19 Claims, 10 Drawing Sheets

(56) References Cited

U.S. PATENT DOCUMENTS

| | | | | |
|---|---|---|---|---|
| 5,967,735 | A * | 10/1999 | Smart | B60P 1/649 |
| | | | | 193/35 C |
| 9,701,466 | B1 * | 7/2017 | Horton | B65D 90/0033 |
| 2004/0040477 | A1 * | 3/2004 | Neumann | B65D 88/129 |
| | | | | 108/55.1 |
| 2004/0083671 | A1 | 5/2004 | Johnson et al. | |
| 2004/0099187 | A1 * | 5/2004 | Cox, Jr. | B65D 88/005 |
| | | | | 108/51.11 |
| 2005/0229820 | A1 * | 10/2005 | Reynard | B65D 88/022 |
| | | | | 108/55.1 |
| 2007/0092365 | A1 * | 4/2007 | Filiatreault | B60P 1/6463 |
| | | | | 414/491 |
| 2008/0219821 | A1 | 9/2008 | Marmur | |
| 2010/0303595 | A1 | 12/2010 | Duell et al. | |
| 2017/0030176 | A1 * | 2/2017 | Stegemoeller | B65D 90/0033 |

* cited by examiner

TRANSPORTABLE CONTAINER WITH SUBFLOOR FOR USE WITH A ROLL-OFF TRUCK

TECHNICAL FIELD

A motor vehicle can be used to deliver and pick up a container, commonly called a roll-off container. The motor vehicle is commonly called a roll-off truck. The roll-off truck is designed to easily position the roll-off container onto a back end of the truck for transporting the container and easily unload the container at a desired location.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Transportable containers are used to fill a variety of needs. The containers can be transported by a truck, commonly referred to in the industry as a roll-off truck. The roll-off truck is equipped with a specific means for loading, transporting, and unloading the container. Alternatively, a motor vehicle can be used with a trailer, wherein the trailer includes the specific means for loading, transporting, unloading the container. As used herein, reference to a "roll-off truck" also includes a "roll-off trailer" without the need to continually specify the alternative throughout. The specific means can include a cable/winch system or a hook/lift system. A common type of container for use with a roll-off truck is called a roll-off dumpster. The roll-off dumpster can be delivered to a site, debris can be placed inside, and then loaded and transported to a dump site where the debris is discarded.

In order to be transportable with a roll-off truck, the container is also equipped with specific means that match the roll-off truck's cable/winch system or hook/lift system. In this manner, the container is able to be loaded, transported, and unloaded in an easy and economical fashion.

Unfortunately, there are many types of containers that are not adapted for use with a roll-off truck. One example of such a container is a cargo or shipping container, such as a conex box, a sea-land container, a storage container, etc. Other examples include portable offices, school rooms, and shelters. These containers generally include a floor that is flat; and thus, lack the necessary equipment, such as railings and wheels that would align with the roll-off truck's hoist system. Accordingly, these types of containers are not capable of being loaded, transported, and unloaded using a roll-off truck. Instead, these types of containers are typically loaded onto a flat bed of a truck using other means, such as a forklift or cable winch system most embodied on most flat-bed tow trucks.

However, there are tens of thousands of these types of containers that could be more easily transported using roll-off trucks with either a cable/winch system or a hook/lift system because of the ease of loading and unloading and the lower cost of using a roll-off truck instead of a flatbed truck and forklift. Moreover, there is a much lower risk of causing damage to the container when using a roll-off truck as opposed to a flatbed truck and forklift. By way of example, shipping containers are used to ship goods around the world. Once these containers arrive at the destination and are unloaded of the goods, the containers often remain in the destination country or city without being re-loaded of cargo and returned to the country of origin or another country. This situation can arise when there is a trade deficit between countries. Consequently, these containers can be re-purposed for use as a dumpster, office space, laboratory, school house, or even temporary shelters for people. Thus, there is a need and an ongoing industry-wide concern to adapt these types of containers for use with a roll-off truck.

It has been discovered that a sub-floor can be attached to the floor of a container. The sub-floor can include the necessary components whereby the container can now be loaded, transported, and unloaded via a roll-off truck. The roll-off truck can include a system for easily loading and unloading the modified container. Such a system can include, for example, a cable/winch system or a hook/lift system. In this manner, the container can now be transported in a simple, efficient, cost-effective, and less damaging manner.

According to certain embodiments, a transportable container comprises: a sidewall; a front wall; a floor; and a subfloor, wherein the subfloor is removably attached to a bottom of the floor, wherein the subfloor comprises: two or more rails, wherein the two or more rails matingly engage with two or more hoist rails of a roll-off truck; and two or more rollers.

Figure 1:
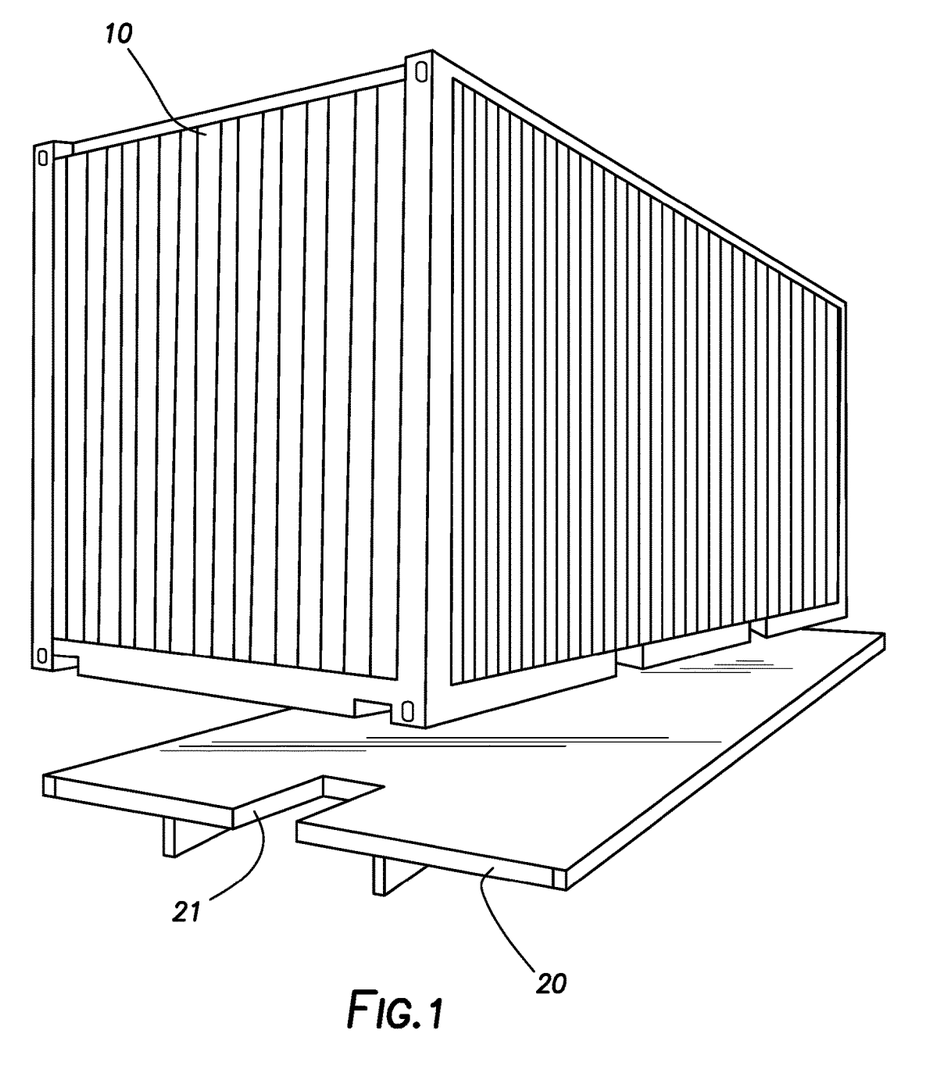
FIG. 1 is a perspective view of a container positioned above a subfloor according to certain embodiments.

Turning to the figures, FIG. 1 is a perspective view of a transportable container 10 and a subfloor 20 according to certain embodiments. The subfloor 20 can include a channel 21. FIG. 1 shows the container 10 and the subfloor 20 pre-attached. That is, the container can be any type of container that is not designed to be loaded, transported, and unloaded using a roll-off truck. It is to be understood that the subfloor is not part of the container manufacturing process (i.e., the container does not include the subfloor at the conclusion of the container's manufacturing process). Thus, the container can be any type of container that can be re-purposed to be used with a roll-off truck. The subfloor 20 is shown positioned underneath a bottom of the container floor.

As used herein, the term "transportable" means the ability to be loaded onto a back of a roll-off truck, moved to another location via the roll-off truck, and unloaded from the back of the roll-off truck, truck bed, or roll-off trailer. As used herein, the term "container" means any device that can hold items or people. As used herein, the term "subfloor" means a floor that is located underneath a bottom plane of a floor of the container.

The container can be, without limitation, a dumpster or a building (e.g., an office space, school, living quarters, or shelter). Non-limiting examples of containers include storage containers, portable offices, portable laboratories, generators, conex boxes, connex boxes, shipping containers, sheds, construction site containers, equipment storage modified containers, office containers, delivery containers, sea train containers, storage boxes, cargo containers, refrigerated containers, insulated containers, ocean containers, wind and watertight containers, refurbished containers, livestock or animal shelters, portable workshops, tool shops, guard shacks, and shelters for humans and/or animals.

Figure 2:
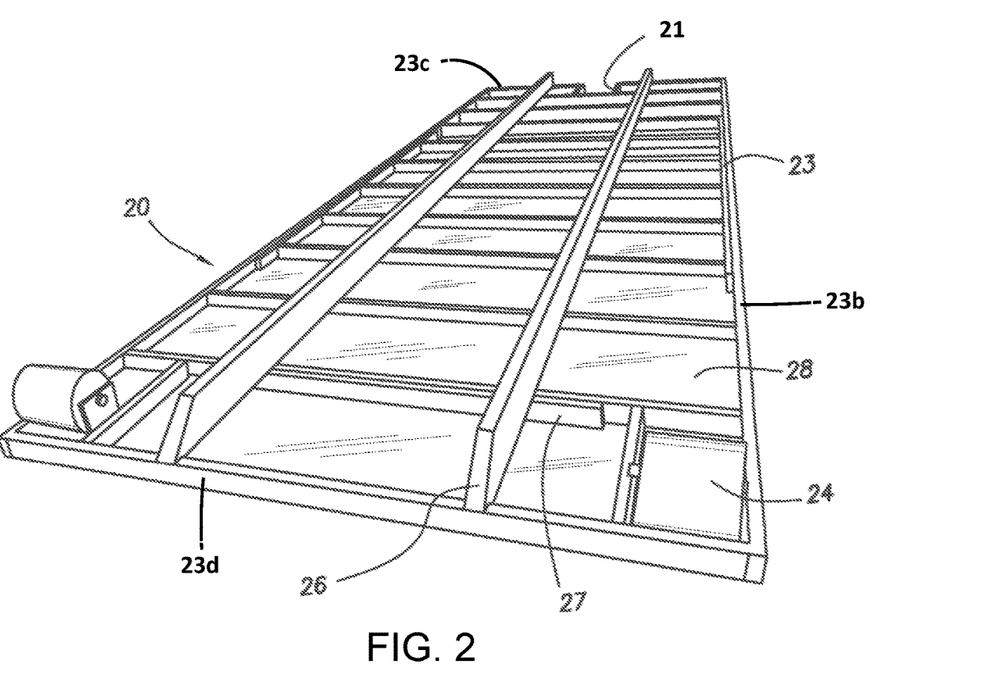
FIG. 2 is a bottom view of the subfloor according to certain embodiments.

FIG. 2 shows an underneath side of the subfloor 20. The subfloor 20 includes two or more rails 26. The rails 26 can be outside rails, inside rails, or guides. Although shown with only two rails 26, the subfloor 20 can also include more than two rails. By way of example, the subfloor 20 can include outside rails and inside rails. The two or more rails 26 matingly engage with two or more hoist rails of a roll-off truck. The phrase "roll-off truck" is a common phrase in the industry that one of ordinary skill in the art will understand to mean a motor vehicle or trailer that utilizes a system (e.g., a cable/winch or a hook/lift) for loading, transporting, and unloading a roll-off container.

The subfloor 20 also includes two or more rollers 24. The rollers 24 in FIG. 2 are depicted at the back of the subfloor 20. The rollers 24 enable the container 10 to be loaded and unloaded from the roll-off truck. The rollers 24 can be positioned in any location on the underneath side of the subfloor 20 to enable the container 10 and subfloor 20 to move via the rollers onto the back of the roll-off truck and assist with proper alignment. The subfloor 20 can also include a front or nose roller (not shown) that is positioned at the front end of the rails 26. The front or nose rollers can also enable the rails 26 of the subfloor 20 to matingly engage with the hoist rails of the roll-off truck. Instead of, or in addition to, the front or nose rollers, the subfloor 20 can also include two or more rollers located on the underneath side of the subfloor 20 at a front end of the subfloor. These front rollers can help enable the mating engagement of the rails and/or enable the floor of the container 10 to be level.

The subfloor 20 can include a front end, sides, and a back end. The subfloor 20 can include one or more center braces 23 that provide structural integrity to the frame of the subfloor 20. The center braces 23 can span a portion or a substantial length of the side frame 23*b*, front frame 23*c*, and/or back frame 23*d*. The center braces 23 can be attached to the frame to create the structural integrity and help reduce or prevent flexing of the frame. The subfloor 20 can also contain one or more cross member supports 27. The cross member supports 27 can span an entire distance between the side frames and be oriented parallel to the front and back frames and oriented perpendicular to the side frames. In this manner, increased structural integrity to the subfloor 20 can be achieved. The subfloor 20 also includes a top surface 28. The top surface 28 is shown in FIG. 2 as being underneath the rails 26 and rollers 24. However, in use, the subfloor 20 would be rotated about a longitudinal axis 180° clockwise or counterclockwise to flip the subfloor 20 wherein the top surface 28 would be in operative contact with a bottom surface of a floor of the container 10. Any of the center braces 23 and/or cross member supports 27 can be attached to one another, the frame, and the substrate that forms the top surface 28 via, for example, welding or spot welding, fastening, bracketing, or bolting.

Figure 3:
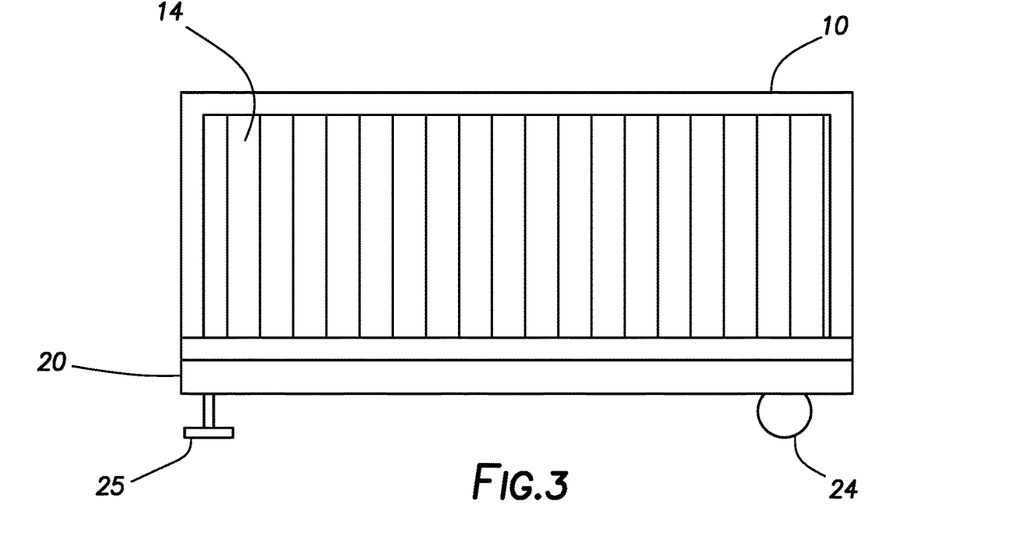
FIG. 3 is a side view of the container and subfloor according to certain embodiments.
Figure 4A:
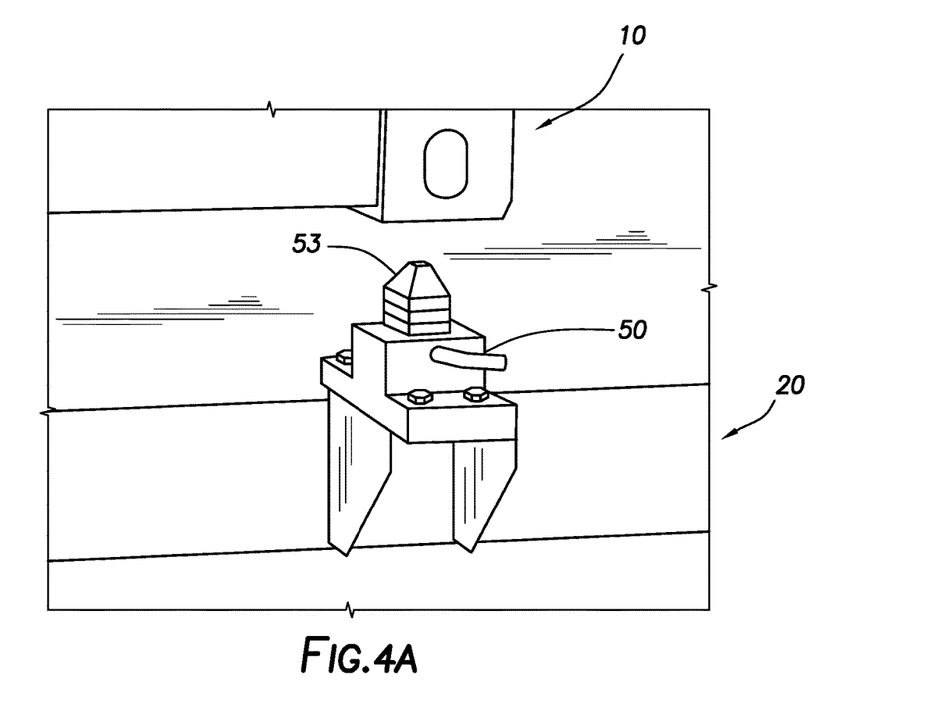
FIGS. 4A-4E are illustrations of a means for removably attaching the subfloor to the bottom of the container according to certain embodiments.
Figure 4B:
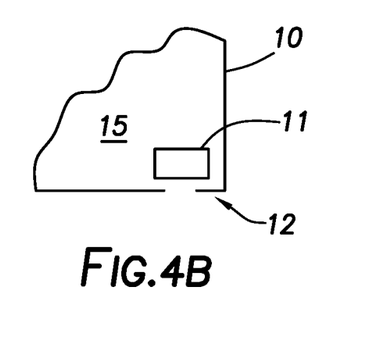
Figure 4C:
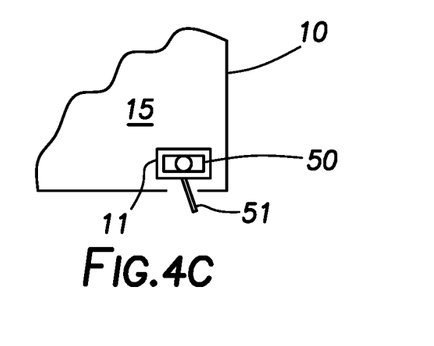
Figure 4D:
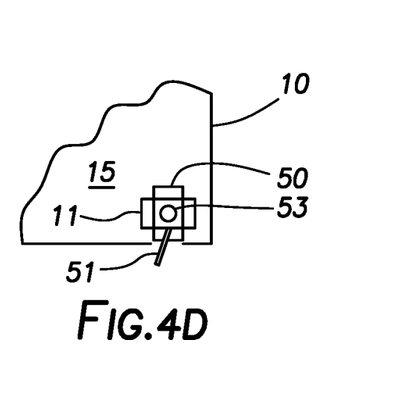
Figure 4E:
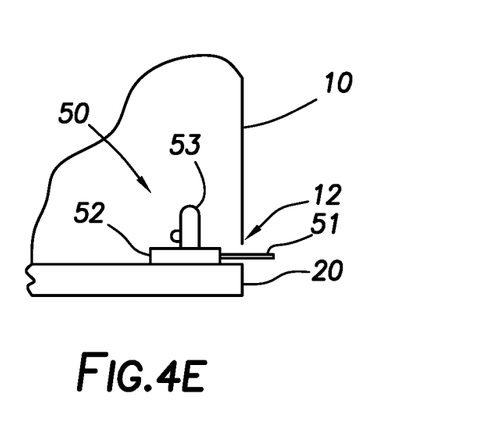

FIG. 3 is a side view of the container 10 and subfloor 20. The container 10 can include two side walls 14, a front wall 13 (shown in FIG. 7), and a floor 15 (shown in FIG. 4B, for example). The container 10 can have an open top, for example, when the container 10 is used as a dumpster, or the container 10 can include a roof (not shown). The roof can be a variety of geometric shapes, such as a flat rectangular roof, an angled roof, or a triangular-shaped roof. A roof may be advantageous when the container 10 is used as a shelter, office, school, or workspace. The container 10 can also include a back wall (not shown). The back wall can open or be permanently closed. For a back wall that opens, the back wall can be hinged along one edge to a corresponding edge of a side wall. In this manner, the back wall can be opened and closed via the hinges. The back wall can further include a latch for securing the back wall to an edge of the side wall opposite of the hinges for securing the back wall in a closed/locked position. The back wall can further include an anchor at a bottom of the back wall for temporarily securing the back wall in an open position. The container 10 can also include one or more doors and/or windows. This embodiment may be useful when the container 10 is used as a shelter, office, school, or workspace, for example.

Also shown in FIG. 3, the subfloor 20 can include two or more adjustable legs 25 located at or near a front end and sides and/or middle of the subfloor. The adjustable legs 25 can be in a retracted position during loading and unloading of the container 10 and in an expanded position during use. The height of the adjustable legs 25 can be adjusted to provide a relatively level floor of the container 10. As discussed above, a front end of the subfloor 20 can also include rollers. The rollers can be in addition to, or instead of, the adjustable legs 25.

The container 10 can be made from a variety of materials including, but not limited to, metals, metal alloys, non-flexible plastics, wood materials, sheetrock, and combinations thereof. The subfloor 20 can also be made from a variety of materials including, but not limited to, metals, metal alloys, non-flexible plastics, and combinations thereof. The container 10 and the subfloor 20 can also have a variety of dimensions. According to certain embodiments, the dimensions of the container 10 are selected such that the container 10 is capable of being loaded, transported, and unloaded using a roll-off truck. According to certain other embodiments, the container 10 has length dimensions in the range of about 1 feet (ft) (0.3 meters (m)) to about 45 ft (13.7 m), width dimensions in the range of about 5 ft (1.5 m) to about 10 ft (3.0 m), and height dimensions in the range of about 1 ft (0.3 m) to about 15 ft (4.6 m). According to certain embodiments, the length and width dimensions of the subfloor 20 are the same or within +/−10% of the length and width of the floor 15 of the container 10.

The subfloor 20 is removably attached to a bottom of the floor 15 of the container 10. The top surface 28 of the subfloor 20 can be removably attached to a bottom plane of the floor 15, for example, via welding or spot welding, fastening, bracketing, or bolting. The welding or spot welding, fastening, bracketing, or bolting can be around a perimeter of the floor and subfloor.

As shown in FIGS. 4A-5B, a fastener 50 can be used to removably attach the subfloor 20 to the container 10. The fastener 50 of FIGS. 4A-4E can include a guide 53, a rotation arm 51, and a rotating plate 52. FIGS. 4B-4D are top views of a corner of the container 10. As shown, the corner of the container 10 can include a fastener opening 11. The fastener opening 11 can have a variety of shapes and dimensions that are selected for receiving the guide 53 and rotating plate 52. According to certain embodiments, the fastener opening 11 and the rotating plate 52 are rectangular in shape and the fastener opening 11 is slightly larger than the size of the rotating plate 52. In this manner, the guide 53 and rotating plate 52 can be inserted through the fastener opening 11 to removably attach the container and subfloor together. The front wall 13 and/or side walls 14 of the container 10 can also include an opening 12, for example, as shown in a side view of FIG. 4E. The opening 12 can be located for receiving the rotation arm 51 of the fastener 50. After insertion of the guide 53 and rotating plate 52 through the fastener opening 11, the rotation arm 51 can be moved in a clockwise or counterclockwise rotation in the opening 12. This rotation moves the rotating plate 52 in the same direction whereby a bottom plane of the rotating plate 52 rotates on top of the floor 15. After rotation, the ends of the rotating plate 52 overlap the floor 15, for example, as shown in FIG. 4D. This overlap removably attaches the subfloor 20 to the container 10.

Figure 5A:
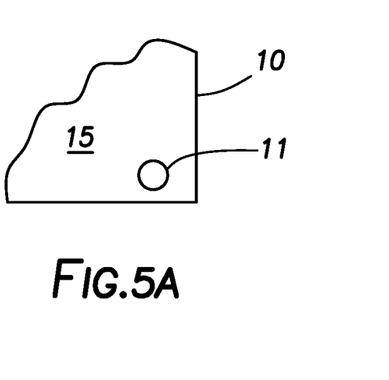
FIGS. 5A and 5B are illustrations of a means for removably attaching the subfloor to the bottom of the container according to certain other embodiments.
Figure 5B:
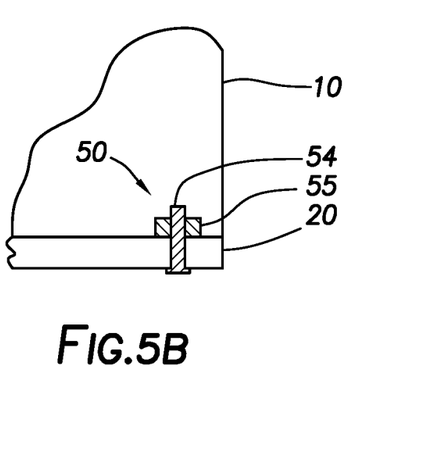

As shown in FIGS. 5A and 5B, the fastener 50 can include a bolt 54 and a nut 55. A washer can be optionally included between the nut and the floor 15. The bolt 54 can be inserted through an opening in the subfloor 20 and fastener opening 11 of the floor 15. The nut 55 can then be tightened on top of the floor 15 in order to removably attach the subfloor 20 to the container 10. The number and spacing of the fasteners 50 can vary and be selected to provide improved structural integrity to the container 10 and subfloor 20 as well as decreasing the risk of separation of the container 10 from the subfloor 20 during loading and unloading.

Figure 6:
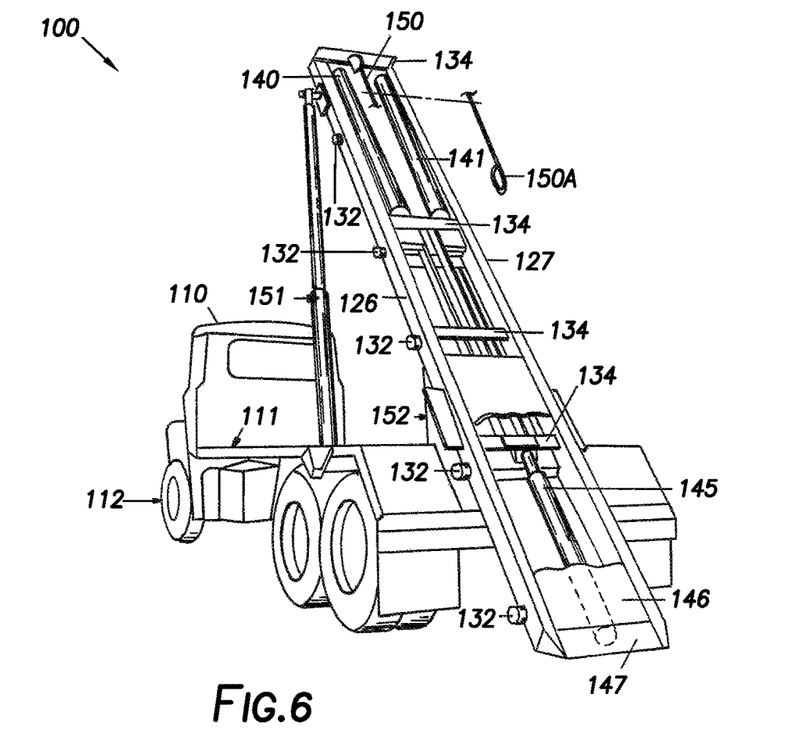
FIG. 6 is a rear perspective view of a motor vehicle for loading and unloading the container and subfloor using a cable/winch system according to certain embodiments.

FIG. 6 shows a roll-off truck 100 according to certain embodiments. The roll-off truck 100 can include a system for loading, transporting, and unloading the container 10 and subfloor 20. The system can be any system that utilizes two or more hoist frames located on the roll-off truck 100 that matingly engage with the two or more rails 26 of the subfloor 20. According to certain embodiments and as depicted in FIG. 6, the system can be a cable/winch system.

The roll-off truck 100 can include a driver's cab 110 on the forward part of a chassis frame 111 that is supported by conventional, steerable front wheel assemblies 112. The rear portion of the chassis frame 111 can be supported by tandem drive wheel assemblies. Other forms of vehicles can be utilized. For example, a trailer having a fifth wheel by which the trailer is driven and controlled by a tractor can be used. A carrier can extend forwardly toward the cab 110 from the hinge bar between parallel and spaced-apart hoist rails 126 and 127, which can form part of a hoist frame. At each spaced-apart location on the outsides of the hoist rails 126 and 127 can be rollers 132 supported on an arbor to matingly engage with the rails 26 of the subfloor 20. Cross braces 134 can tie the hoist rails 126 and 127 together to prevent their movement toward or away from each other. Housing assemblies can form two longitudinal chambers to slideably receive sheave blocks that are mounted on the rod ends of winch cylinders 140 and 141, respectively.

A tie plate can interconnect plates at the top of the housing assemblies and form an elongated chamber between wherein the rod end of a piston and cylinder assembly 145 is protectively housed when the piston is extended from the cylinder portion. A guard plate 146 can extend between the hoist rails 126 and 127 above the housing assemblies and from a ramp 147, which is welded to the hoist rails 126 and 127, to a point forward from a hinge pin. The guard plate 146 can extend forwardly along the hoist to protectively cover the piston and cylinder assembly 145, when fully extended, to prevent damage that might otherwise occur in the event of a derailment of the container 10 and subfloor 20 during loading and unloading operations on the hoist. The cylinder portion of the piston and cylinder assembly 145 can be flange-mounted to an end wall of a cross-member forming ramp 147. The rod end of the piston and cylinder assembly 145 can be mounted by a clevis pin extending through a clevis end of the piston rod and through a clevis support, which is secured to the slide carrier. A cable 150 can be anchored at one end to a hoist rail and trained about a system of pulleys that includes a sheave and bocks in a manner known in the art, so that a hook 150A on the free end of the cable can be drawn along the length of the hoist rails 126 and 127.

Hoist rails 126 and 127 can extend from the ramp 147 forwardly beyond the plane of a pivot shaft along the subframe on the chassis frame 111 to a point that is about 6 inches from the back of the driver's cab 110. Connected to the sides of the forward portion of the hoist rails 126 and 127 are the rod ends of piston and cylinder assemblies 151 and 152, which are pivotally mounted at their cylinder ends by brackets to the chassis frame 111 of the roll-off truck 100. The piston and cylinder assemblies 151 and 152 can link the forward portion of the hoist rails 126 and 127 to the chassis frame 111 so that the rails jut from the roll-off truck 100 for loading or unloading the container 10 and subfloor 20.

Figure 7:
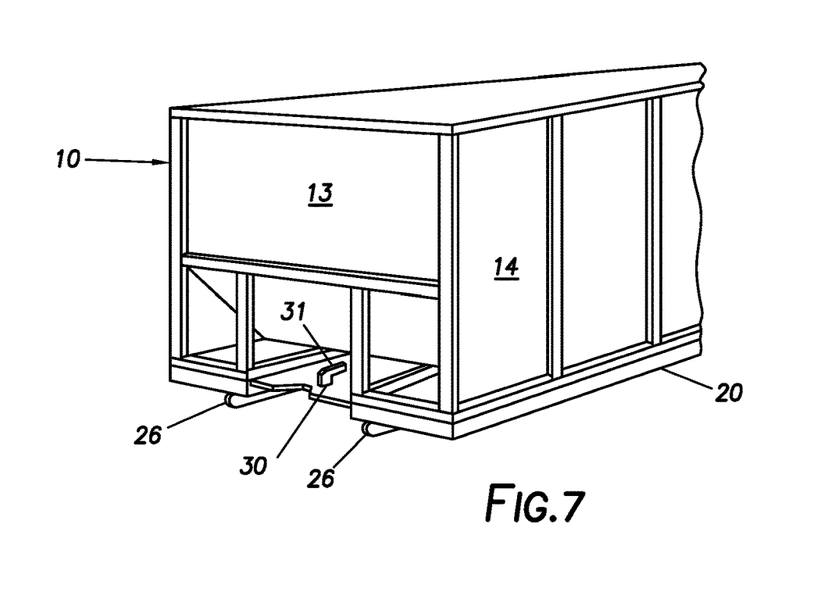
FIG. 7 is a front perspective view according to certain embodiments of a container for use with the loading and unloading system of FIG. 6.
Figure 8:
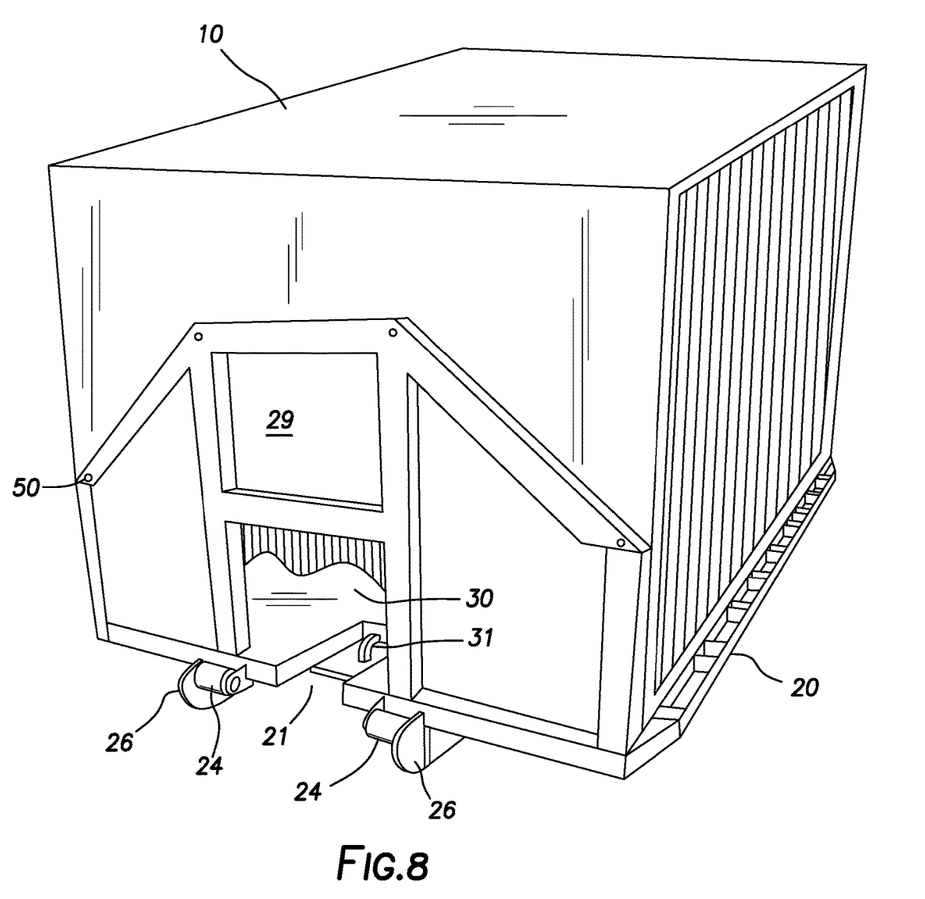
FIG. 8 is a front perspective view according to other certain embodiments of a container for use with the loading and unloading system of FIG. 6.
Figure 9A:
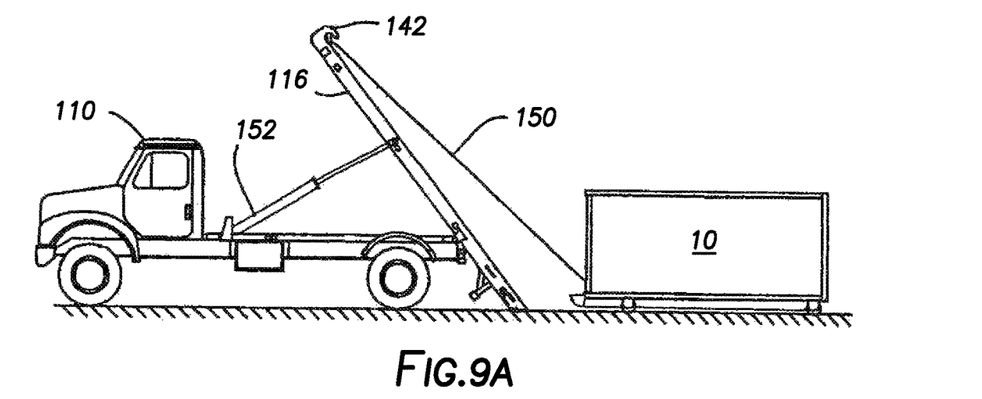
FIGS. 9A-9F are side views of loading and unloading the container with the system of FIG. 6.
Figure 9B:
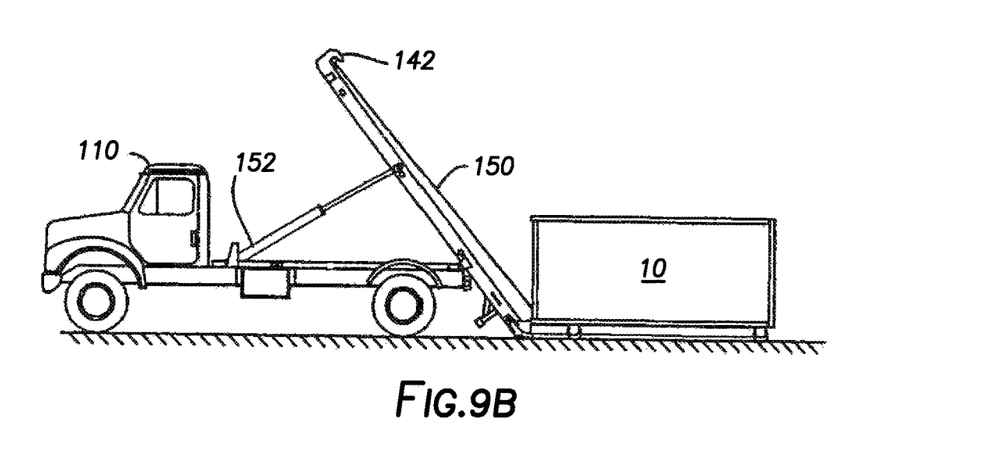
Figure 9C:
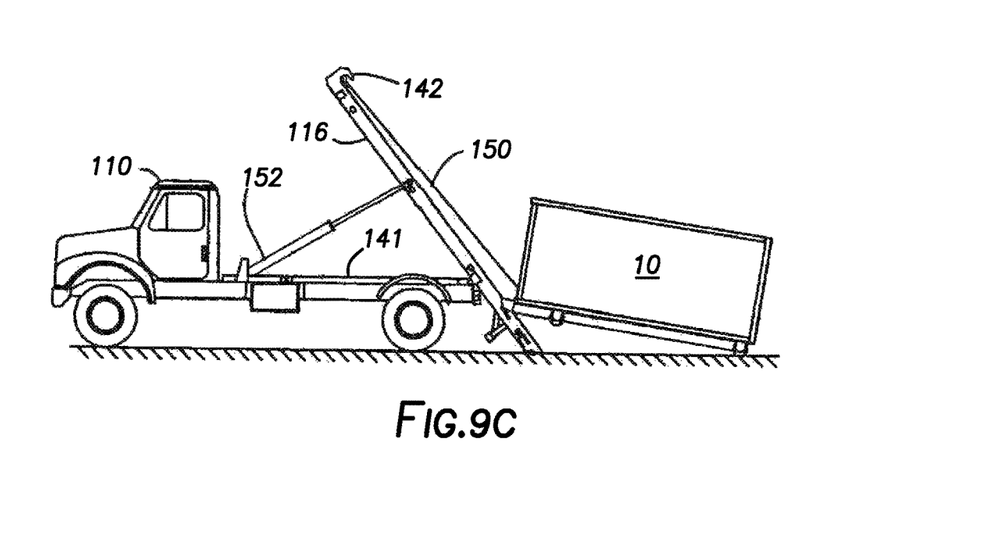
Figure 9D:
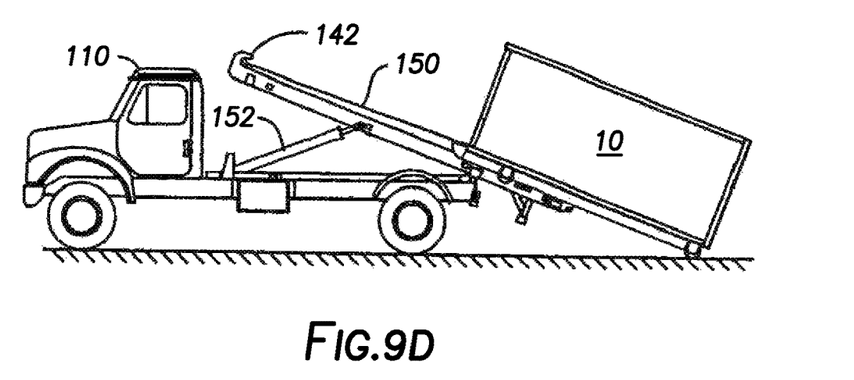
Figure 9E:
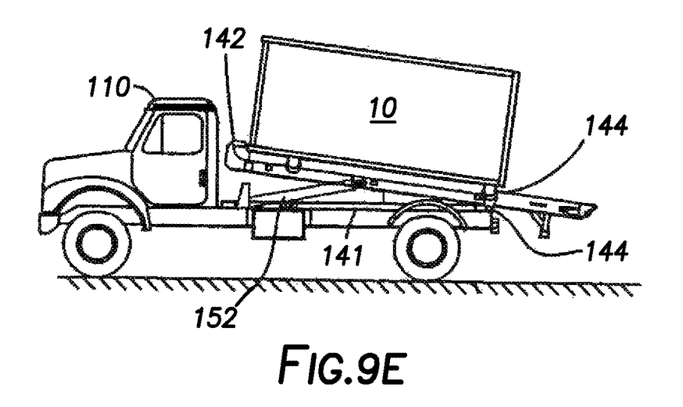
Figure 9F:
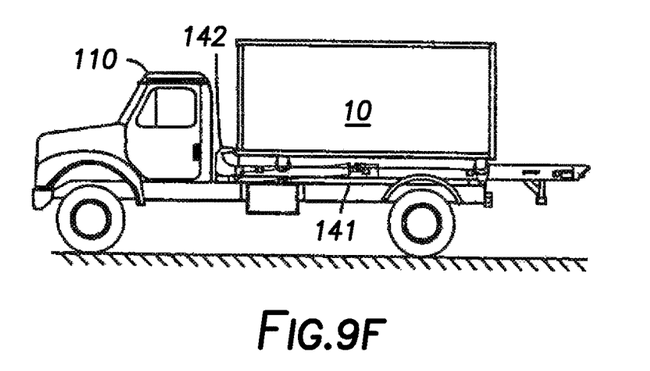

As shown in FIG. 7, the container 10 can include a front wall 13 and side walls 14. A front end of the subfloor 20 can include a hook plate 30 and a hook 31. As shown in FIG. 8, the subfloor 20 can include a channel 21, the hook plate 30, the hook 31, and a front wall 29. The front wall 29 shown in FIG. 8 is commonly referred in the industry as a dog house. The front wall 29 of the subfloor 20 can be fastened and secured to the front wall 13 of the container 10 via any type of fastener 50, such as welding, spot welding, or anchors (e.g., a bolt and nut). The subfloor 20 includes the rails 26 and optional rollers 24.

FIG. 9A-9F depict loading of the container 10 and subfloor 20 onto the back of the roll-off truck 100 using the cable/winch system. The roll-off truck 100 can include a top frame 116 that can preferably include a top frame hinge assembly 144 and a sub-frame preferably includes a sub-frame hinge assembly that are adapted to engage one another to provide the capability of pivotal movement of the top frame 116 with respect to the sub-frame between the horizontal or transporting position and the upwardly inclined loading and/or unloading position. The sub-frame can include a saddle 142 to further facilitate receiving of a front section of the container 10.

For loading, the hook 150A is secured to the hook 31. The cable is then powered by a source of power and hydraulic fluid to engage the piston and cylinder assemblies 145, 151, and 152. The length of the cable is decreased whereby a front of the container 10 is moved towards the ramp 147. The front and back rollers 24 of the subfloor can aid movement of the container 10. As the container 10 moves forward, the rails 26 of the subfloor 20 become aligned with the hoist rails 126 and 127. The rails 26 then matingly engage the hoist rails 126 and 127 to align and move the container 10 onto the bed of the roll-off truck 100. The rails 26 continue the mating engagement and slide alongside the hoist rails 126 and 127 during loading and unloading. After loading is complete, the top frame 116 will be parallel with the chassis frame 111. The roll-off truck 100 and container 10 can further include a locking mechanism (not shown) for securing the container 10 to the bed of the roll-off truck 100 during transportation.

Figure 10:
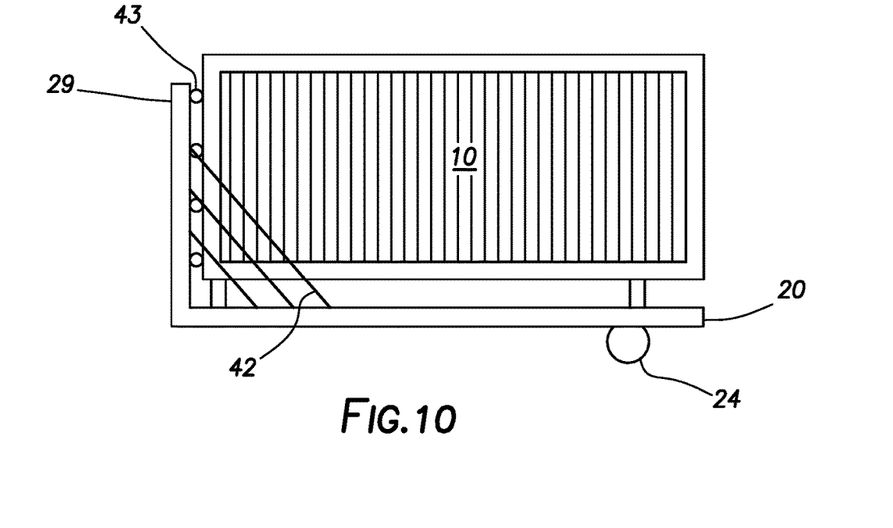
FIG. 10 is a side view of a container for use with a hook/lift system according to certain embodiments.
Figure 11:
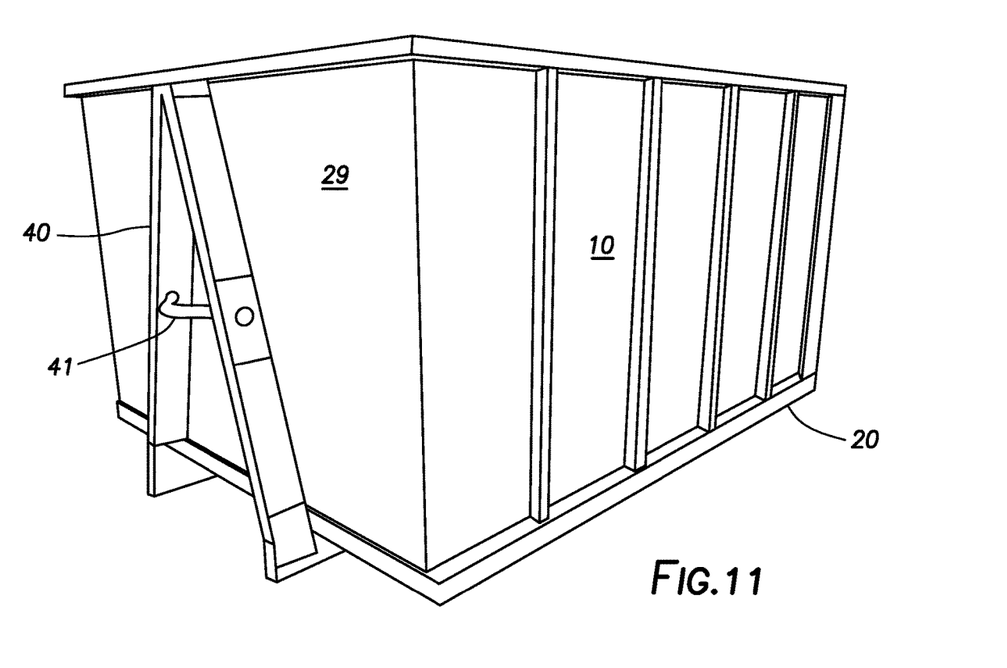
FIG. 11 is a front perspective view of a container for use with a hook/lift system according to certain other embodiments.
Figure 12:
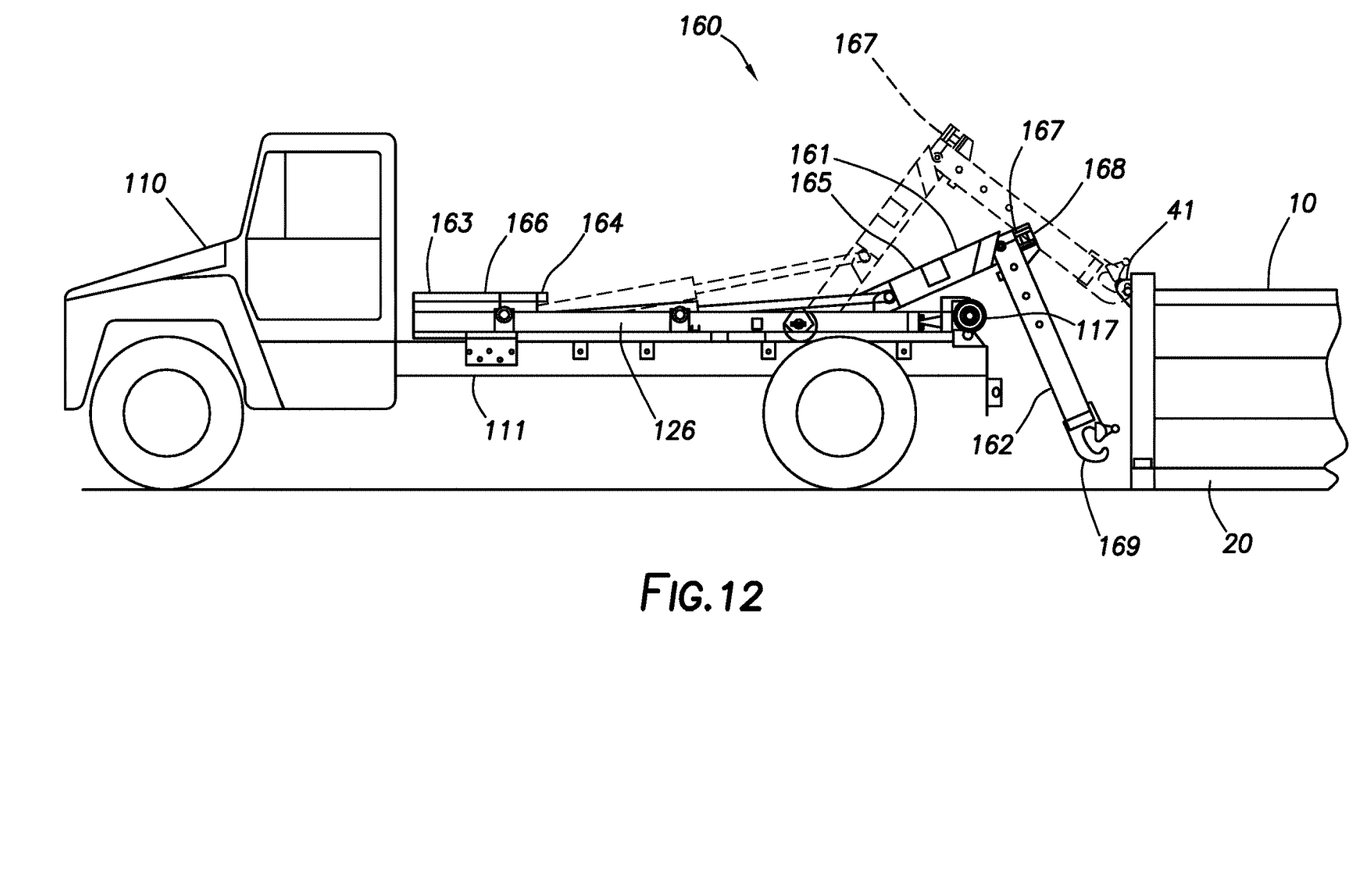
FIG. 12 is a side view of a motor vehicle for use with a hook/lift system according to certain embodiments.

FIGS. 10-12 depict a system for loading, transporting, and unloading the container 10 according to certain other embodiments. As shown in FIGS. 10-12, the system is a hook/lift system. According to these other embodiments, the front wall 29 of the subfloor 20 can be attached to the front wall 13 of the container 10 at one or more attachment points 43, for example, via welding or spot welding. The front wall 29 can include a frame 40, commonly referred to in the industry as an A-frame, with a cross-member 41 spanning between two parts of the frame. The cross-member 41 can have a variety of shapes including, but not limited to, triangular, U-shaped, and semi-circular and be made of any material that provides structural integrity to the frame and cross-member. The subfloor 20 can also include one or more lateral structural supports 42 that are positioned between a side and front wall of the subfloor 20, wherein the container 10 resides inside these lateral structural supports. The lateral structural supports 42 can inhibit or prevent the container 10 from becoming unsecured to the front wall 29 of the subfloor 20 during loading, transport, and unloading.

FIG. 12 depicts a roll-off truck 100 utilizing the hook/lift assembly 160. As shown, the roll-off truck 100 can include a sub-frame, a tilt frame, a lift arm 167, left and right hydraulic actuators, lift arm latch 168, and a pair of tilt frame coupling members or ring locks. The sub-frame is fixedly secured to the chassis frame 111, the tilt frame is pivotally connected to the sub-frame at their respective rear ends, and the lift arm 167 is pivotally connected to the tilt frame. The lift arm latch 168 releasably connects the lift arm 167 to the tilt frame to prevent the lift arm from pivoting relative to the tilt frame when the tilt frame is pivoted relative to the chassis frame 111. The tilt frame ring locks releasably connect or tie the tilt frame to the chassis frame 111 to selectively prevent the tilt frame from pivoting relative to the chassis frame 111 and to distribute the load exerted on the tilt frame by the lift arm 167 to the chassis frame 111, when the lift arm is used to lift a container 10.

The sub-frame includes parallel extending hoist rails 126 and 127, which are fixedly connected to left and right main frame beams respectively by bolting, clamping, welding or the like. The lift arm 167 is generally L-shaped and includes a first leg 161 connected to and extending perpendicular to a second leg 162. The first leg 161 is further formed from an inner section telescopically mounted within an outer section or outer boom 165. An outer end of the inner section is connected to the second leg 162 and collectively the inner section of first leg 161 and second leg 162 may be referred to as the inner boom. A hydraulic actuator connected between the inner section and outer boom 165 is used to selectively extend and retract the inner boom relative to the outer boom 165 through controls (not shown) provided on the roll-off truck 100. The lift arm latch 168 is mounted on the inner boom at the corner between the first and second legs 161 and 162. As the inner boom is extended toward the front of the roll-off truck 100, with the lift arm 167 in the pivotally retracted position, the lift arm latch 168 engages a lift arm latch receiver 166 mounted to the tilt frame between the hoist rails 126 and 127 to latch or lock the lift arm 167 to the tilt frame. The latch receiver 166 is formed by a pair of inwardly facing channel members connected to the hoist rails 126 and 127 by struts. The channel members extend between and parallel to the hoist rails 126 and 127 from the front end of the tilt frame to a position just short of the space occupied by the lift arm latch 168 when the lift arm is in the pivotally retracted position and the inner boom is fully retracted.

Horizontal guide members 164 help guide the inner boom and the lift arm latch 168 into a receiver channel and slot. If the inner boom is extended relative to the outer boom 165 to a sufficient degree as the lift arm 167 is pivoted toward its retracted position, the outer edges of the pivotal latch members will engage the vertical guide members 163 of channel members to help maintain vertical position of the container 10. A container coupling member or hook 169 is formed on the free end of the second leg 162 opposite the first leg 161. The hook 169 engages the cross-member 41 of the frame 40 to permit movement of the container 10 by the lift arm 167. The hook 169 is secured to the cross-member 41 to load the container 10 onto the bed of the roll-off truck 100. As with the cable/winch system, movement of the container 10 towards a read end of the roll-off truck 100 occurs as the lift arm 167 is engaged, whereby the rails 26 matingly engage with hoist rails 126 and 127. A roller bar 117 can facilitate loading and unloading of the container 10.

Loading and unloading of the container 10 onto and off of the bed of the roll-off truck 100 can occur with the inner boom retracted relative to the outer boom 165. After the container 10 has been pulled up and matingly engages with the hoist rails 126 and 127 by pivoting the lift arm 167 to the retracted or loaded position, the container 10 can be moved further onto the hoist rails 126 and 127 and toward the cab 110 of the roll-off truck 100 by extending the inner boom relative to the outer boom 165 through extension of a boom extension actuator.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps. It should also be understood that, as used herein, "first," "second," and "third," are assigned arbitrarily and are merely intended to differentiate between two or more phases, etc., as the case may be, and does not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A transportable container comprising:
   a sidewall;
   a front wall;
   a floor, wherein the floor comprises a top plane and a bottom plane; and
   a subfloor, wherein the subfloor is removably attached to a bottom of the floor, wherein the subfloor comprises:
      a planar, solid, contiguous piece of material that spans at least substantially the entire width and length of the floor and makes up a top surface of the subfloor, wherein at least a portion of the top surface of the subfloor is in direct contact with the bottom plane of the floor after attachment;
      two or more rails attached to a bottom plane of the top surface, wherein the two or more rails matingly engage with two or more hoist rails of a roll-off truck; and
      two or more rear rollers located at a back end of the subfloor,
   wherein the length and width dimensions of the subfloor are within +/−10% of the length and width of a floor of the container.

2. The transportable container according to claim 1, wherein the two or more rails are outside rails, inside rails, or guides.

3. The transportable container according to claim 1, wherein the subfloor further comprises a front or nose roller positioned at a front end of the two or more rails.

4. The transportable container according to claim 1, wherein the subfloor further comprises a side frame, a front frame, and a back frame, and further comprises one or more center braces, wherein the center braces span a portion or a substantial length of the side frame, front frame, or back frame.

5. The transportable container according to claim 4, wherein the subfloor further comprises one or more cross member supports, wherein the cross member supports span an entire distance between the side frames and are oriented parallel to the front and back frames and oriented perpendicular to the side frames.

6. The transportable container according to claim 5, wherein the center braces and cross member supports are attached to at least one of each other, the side frame, the front frame, or the back frame, and are further attached to the bottom plane of the top surface of the subfloor via welding or spot welding, fastening, bracketing, or bolting.

7. The transportable container according to claim 1, wherein the container has an open top or further comprises a roof.

8. The transportable container according to claim 1, wherein the container has length dimensions in the range of 1 feet to about 45 feet, width dimensions in the range of 5 feet to about 10 feet, and height dimensions in the range of 1 feet to about 15 feet.

9. The transportable container according to claim 1, wherein the at least a portion of the top surface of the subfloor is removably attached to the bottom plane of the floor via welding or spot welding, fastening, bracketing, or bolting.

10. The transportable container according to claim 1, wherein the at least a portion of the top surface of the subfloor is removably attached to the bottom plane of the floor via a fastener.

11. The transportable container according to claim 10, wherein the fastener comprises a guide, a rotation arm, and a rotating plate, wherein a floor of the container comprises one or more openings for receiving the guide and the rotating plate, and wherein a side wall, front wall, back wall, or combinations thereof comprise one or more openings for receiving the rotation arm.

12. The transportable container according to claim 11, wherein the subfloor is removably attached to the floor of the container via insertion of the guide and rotating plate through one of the floor openings and rotating the rotation arm, and wherein after rotation of the rotation arm, the rotating plate matingly engages with a top surface of the floor of the container.

13. The transportable container according to claim 10, wherein the fastener comprises a bolt and a nut, wherein a floor of the container and the subfloor includes one or more openings for receiving the bolt.

14. The transportable container according to claim 13, wherein the subfloor is removably attached to the floor of the container via insertion of bolt through one of the floor and subfloor openings and affixing the nut onto an end of the bolt.

15. The transportable container according to claim 1, wherein the transportable container is transportable by the roll-off truck via a system for loading, transporting, and unloading the container and subfloor.

16. The transportable container according to claim 15, wherein the system utilizes the two or more hoist frames located on the roll-off truck that matingly engage with the two or more rails of the subfloor.

17. The transportable container according to claim 16, wherein the system is a cable/winch system.

18. The transportable container according to claim 17, wherein a front end of the subfloor comprises a hook plate and a hook, wherein the roll-off truck comprises a hook for engaging with the hook of the subfloor, and wherein the container and subfloor are loaded or unloaded from the roll-off truck via attachment of the hooks and activating a hydraulic system of the roll-off truck for moving the container and subfloor.

19. The transportable container according to claim 15, wherein the system is a hook/lift system, wherein a front wall of the container comprises a frame and a cross-member spanning between two parts of the frame, wherein the roll-off truck comprises a hook for engaging with the cross-member, and wherein the container and subfloor are loaded or unloaded from the roll-off truck via attachment of the hook to the cross-member and activating hook/lift system for moving the container and subfloor.

* * * * *